United States Patent
Kempf et al.

(10) Patent No.: US 8,939,438 B2
(45) Date of Patent: Jan. 27, 2015

(54) PLASTIC SPRING AND METHOD AND APPARATUS FOR MAKING THE SAME

(75) Inventors: Stephen Kempf, Brooklyn, NY (US); Albert Mangels, Rockaway Park, NY (US); Subramanya Naglapura, Princeton, NJ (US); Sean Diamond, Dover Plains, NY (US); Brian Moulder, Orange, CT (US); Brian Straiton, Brookfield, CT (US)

(73) Assignee: Lee Spring Company LLC, Brooklyn, NY (US)

( * ) Notice: Subject to any disclaimer, the term of this patent is extended or adjusted under 35 U.S.C. 154(b) by 966 days.

(21) Appl. No.: 12/684,244

(22) Filed: Jan. 8, 2010

(65) Prior Publication Data

US 2011/0169205 A1  Jul. 14, 2011

(51) Int. Cl.
- *F16F 1/04* (2006.01)
- *B29C 45/44* (2006.01)
- *F16F 1/02* (2006.01)
- *B29L 31/00* (2006.01)

(52) U.S. Cl.
CPC ............... *B29C 45/44* (2013.01); *F16F 1/021* (2013.01); *F16F 1/042* (2013.01); *F16F 1/047* (2013.01); *B29L 2031/7742* (2013.01)
USPC .......................................... 267/166; 267/148

(58) Field of Classification Search
USPC ................................................ 267/166–180
See application file for complete search history.

(56) References Cited

U.S. PATENT DOCUMENTS

| 2,323,286 | A | | 7/1943 | Ward |
| 4,111,407 | A | * | 9/1978 | Stager .................. 267/166.1 |
| 4,235,427 | A | | 11/1980 | Bialobrzeski |
| 4,260,143 | A | | 4/1981 | Kliger |
| 4,434,121 | A | | 2/1984 | Schaper |
| 4,531,016 | A | * | 7/1985 | Duve .................. 174/87 |
| 4,728,474 | A | | 3/1988 | Beall |
| 5,062,619 | A | * | 11/1991 | Sato .................. 267/154 |
| 5,181,668 | A | * | 1/1993 | Tsuji et al. .................. 242/387 |
| 5,516,085 | A | * | 5/1996 | Piepenstock .................. 267/166 |
| 5,546,614 | A | * | 8/1996 | King, II .................. 4/256.1 |
| 5,549,370 | A | | 8/1996 | Folsom |
| 6,193,225 | B1 | * | 2/2001 | Watanabe .................. 267/180 |
| 7,178,187 | B2 | * | 2/2007 | Barman et al. .................. 5/716 |
| 7,442,032 | B2 | | 10/2008 | Tu |
| 7,857,294 | B2 | * | 12/2010 | Spencer et al. .................. 267/148 |

(Continued)

FOREIGN PATENT DOCUMENTS

| DE | 20209051 | 4/2003 |
| DE | 102005001159 | 7/2006 |

(Continued)

OTHER PUBLICATIONS

Kato Spring (SP Pte Ltd.), Company Profile, 1 page; http://www.kato.com.sg/plastic.htm.

(Continued)

*Primary Examiner* — Christopher Schwartz
(74) *Attorney, Agent, or Firm* — Cozen O'Connor

(57) ABSTRACT

This invention provides a helical spring formed of plastic material, comprising a pair of end coils situated at respective ends of said helical spring; at least one full pitch active coil between said pair of end coils; a pair of transition coils, each transition coil interconnecting an end of a respective end coil to an end of a respective proximate full pitch active coil, and having a varying pitch.

6 Claims, 17 Drawing Sheets

(56) References Cited

U.S. PATENT DOCUMENTS

2002/0190451 A1 * 12/2002 Sancaktar et al. ............ 267/166
2007/0021718 A1    1/2007 Burren et al.

FOREIGN PATENT DOCUMENTS

| EP | 0828527 | 3/1998 |
| FR | 2612782 | 9/1988 |
| WO | 94/07562 | 4/1994 |
| WO | 2004/078239 | 9/2004 |

OTHER PUBLICATIONS

Advanex, Products Information, 2 pages; http://www.advanex.co.jp/products_e/plastic_springs.php.

Performance Plastics Ltd., Metal Replacement, 2 pages; http://www.performanceplastics.com/metal/metal.shtml.

* cited by examiner

PLASTIC SPRING AND METHOD AND APPARATUS FOR MAKING THE SAME

FIELD OF THE INVENTION

This invention relates generally to helical springs and, more particularly, to helical springs made from plastic and methods and apparatus for making helical plastic springs.

BACKGROUND OF THE INVENTION

Helical springs are used in a wide variety of applications in part due to their simple configuration. Generally, helical springs have an outer diameter sized to fit within a cylindrical bore and/or an inside diameter sized to fit over a rod. Often, the end coils of the spring are ground or otherwise tapered to be in a plane perpendicular or square to the cylindrical axis of the spring so that the reaction of the spring to forces parallel to the cylindrical axis which are applied to the spring includes a minimal amount of radial (side) thrust. Tapering of the ends also reduces the solid height of the spring, i.e., the overall length of the spring in the fully compressed state, so that the spring requires a minimal amount of space in the device of which it forms a part. Helical springs are often used in critical applications, such as medical devices, sensitive instrumentation, fluid power control valves and aerospace equipment.

Helical compression springs are often constructed of a high-carbon spring steel since that metal has high strength and therefore provides high load bearing capability and is inexpensive and readily available. Other suitable metal materials are also used. To date, a variety of metal alloys have been suggested to meet secondary requirements (as detailed in the following paragraph) with varying degrees of success.

However, there are applications for helical springs in which a certain load bearing capability is required, normally provided by spring steel, but for which spring steel is not suitable. For example, spring steel is not suitable for applications that require that the spring be made from a material having properties such as resistance to chemical corrosion, imperviousness to magnetic fields, retention of properties at elevated temperatures, being lightweight, and low thermal and electrical conductivity, among others.

Additionally, many products that use helical springs are made of environmentally friendly materials and are generally recyclable except for the small but critical metallic helical spring. Such products must therefore be disassembled prior to recycling to remove the metal spring from the recyclable components. Such disassembly is expensive to the point that recycling can become cost prohibitive.

It is seen from the foregoing that there is a need for a helical spring made of a material which provides good strength characteristics such as load bearing capability and high strength to weight ratio, and which at the same time is recyclable, highly resistant to corrosion, lightweight, non-magnetic, and has low electrical conductivity and low thermal conductivity. Helical springs formed of plastic material have been suggested for use in applications that require one or more of the properties mentioned above, e.g. resistance to corrosion. However, plastic materials have a relatively low strength as compared to spring steel and traditional spring designs using plastic will generally not provide sufficient load bearing capability or strength to weight ratio for most applications.

Furthermore, while it is desirable to utilize injection molding in the manufacture of plastic products due to its relative economy and high degree of accuracy in forming plastic parts, it is difficult to create practical mold designs for the manufacture of helical springs from plastic material. Conventional mold tool designs have four relatively similar mold sections that come together to form the mold cavity equally for each circular quadrant of the spring. Molten plastic material is injected into the mold cavity formed by the mold sections through a center or core pin around which the four mold sections are situated. After cooling, the mold sections pull apart and the spring is released from the mold. However, this conventional method of tool design cannot achieve the smooth helical shape desired for the part. The main problem is undercuts inherent in a helix which impede the withdrawal of the multi-section mold from the helical spring after the molding operation resulting in kinks every quarter turn at the mating surfaces of the mold sections. It is also difficult to achieve a uniformly smooth surface for the molded product due to the presence of knit lines from material flows during an injection molding process. These kinks and knit lines act as stress points at which breakage of the spring may occur over extended use.

SUMMARY OF THE INVENTION

Accordingly, it is an object of a first aspect of the present invention to provide a new and improved helical spring design made from plastic material.

Another object of the first aspect of the present invention is to provide a new and improved helical spring made from plastic material having good strength characteristics.

Still another object of the first aspect of the present invention is to provide a new and improved plastic spring that performs under load with minimum side thrust.

Yet another object of the first aspect of the present invention is to provide a new and improved plastic helical spring which minimizes any stress raisers such as knit lines or kinks in the surface of the spring.

An object of a second aspect of the present invention is to provide a new and improved design of a mold for making plastic springs.

Another object of the second aspect of the present invention is to provide a new and improved mold design for making a plastic helical spring having good strength characteristics.

Still another object of the second aspect of the present invention is to provide a new and improved mold design for making a plastic spring that minimizes the formation of knit lines and kinks in the surface of the spring which would act as stress points.

An object of a third aspect of the present invention is to provide a new and improved method for manufacturing plastic helical springs.

Another object of the third aspect of the present invention is to provide a new and improved method for manufacturing a plastic helical spring having good strength characteristics.

Still another object of the third aspect of the present invention is to provide a new and improved method for making a plastic spring that minimizes the formation of knit lines and kinks in the surface of the spring which would act as stress points.

Briefly, these objects of the first aspect of the present invention, among others, are attained by providing a helical spring formed of plastic material comprising an end coil at each end of the spring followed by active transition coils of varying pitch and any number of active full pitch coils of constant pitch in between the transition coils. References herein and in the claims to "coils" refer to either "full coils" or segments" of full coils.

A gradual transition coil with variable pitch is thus inserted between the last full pitch active coils, if any, and the end coil at each end of the spring. The transition coil maximizes the square/flat load bearing surface of the end coil while maintaining a smooth kink-free design in which stress points are minimized and allows for injection mold separation after formation.

The above-stated objects of the first aspect of the present invention, among others, are also attained by providing a helical spring formed of plastic material comprising a pair of end coils, each at a respective end of the helical spring, a plurality of active coils between the pair of end coils; and wherein the end coils are each squared, closed and gradually tapered in thickness from the point at which the end coil is connected to the transition coil towards the free end of the end coil.

The end coils are squared and tapered towards their ends to minimize side thrust and maximize flat load bearing surfaces without creating stress points or increasing the solid height of the spring, again accounting for manufacturability. The reduction in the material at the end coils results in a lightweight spring without affecting its performance.

The above-stated objects of the first aspect of the invention, among others, are also attained by providing that the cross-section of the coils of the spring is substantially rectangular and preferably trapezoidal, decreasing in height from the inside out. The substantially rectangular cross-section maximizes the amount of active material as compared to the more common round cross-section utilized in helical springs made from spring steel. The slight outward tapering of the rectangular cross-section facilitates manufacturability.

The above-stated objects of the second aspect of the present invention, among others, are attained by providing a mold apparatus for molding a plastic helical spring constituted by a helically coiled length of plastic having a rectangular or trapezoidal cross section defining top, bottom, inner and outer surfaces comprising a plurality of mold sections having die surfaces, the mold sections adapted to be situated in a closed position so that the die surfaces form a cavity having a plurality of helical coils or a portion thereof, and wherein the die surfaces of each of the mold sections form one of either a top surface or a bottom surface portion of an active coil of the spring, but not both.

This design has a plurality of mold sections, each of which has a distinct die surface design that serves as a molding surface for either a top surface or a bottom surface of a particular segment of an active coil of the spring. The die surfaces also serve as interlocking tapered shutoff surfaces relative to the die surfaces of other mold sections to achieve good alignment between the mold sections and to facilitate free release of the molded spring.

The above-stated objects of the third aspect of the present invention, among others, are attained by providing a method for manufacturing a plastic helical spring comprising the steps, among others, of forming a die cavity utilizing a plurality of mold sections for a helical spring whose coils have a substantially rectangular or trapezoidal cross section and providing each mold section with molding surfaces for forming either the top surface of an active spring coil or the bottom surface of an active spring coil, but not both.

DESCRIPTION OF THE DRAWINGS

A more complete appreciation of the present invention and many of the attendant advantages thereby will be readily understood by reference to the following detailed description of a preferred embodiment (to which the invention is not limited) when taken in conjunction with the accompanying drawings in which.

DESCRIPTION OF THE PREFERRED EMBODIMENT

Figure 1:
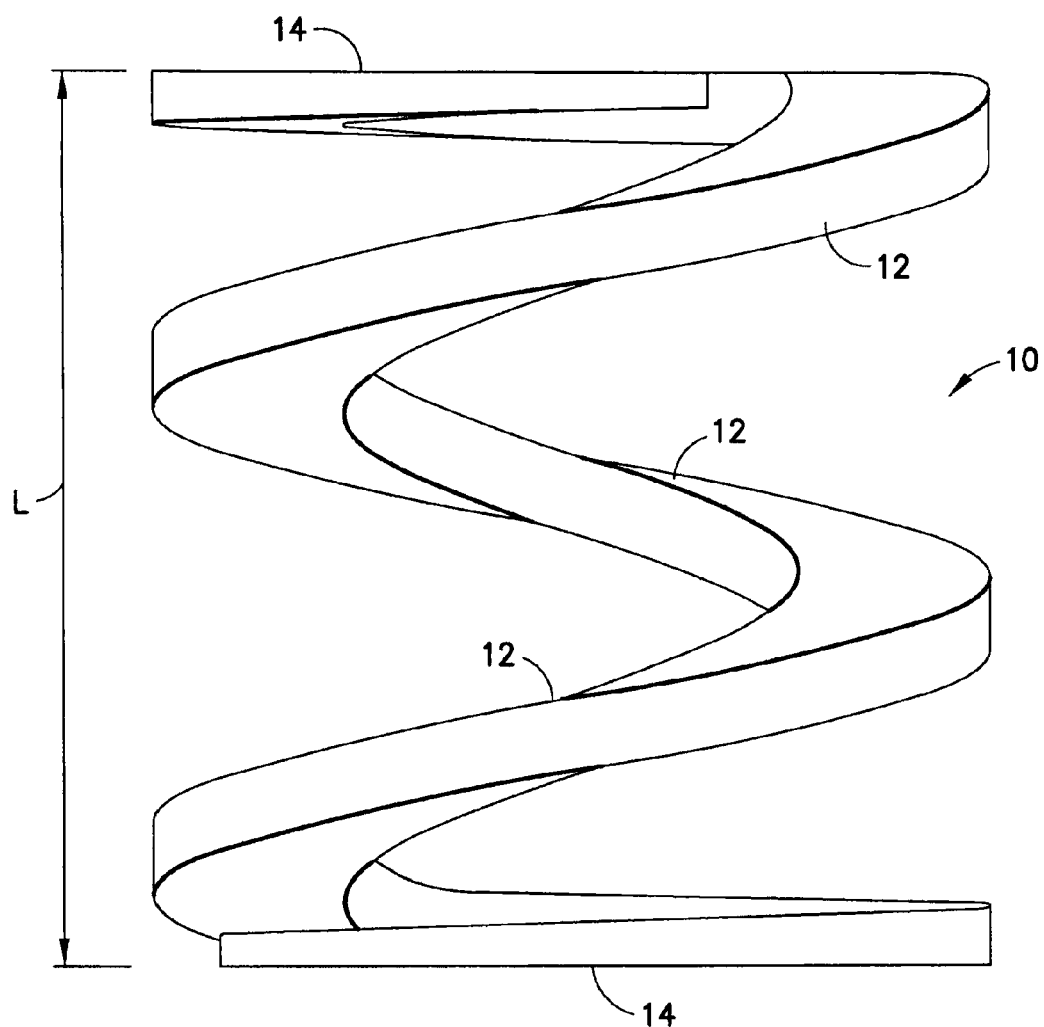
FIG. 1 is a side elevation view of a plastic helical spring in accordance with the present invention.
Figure 2:
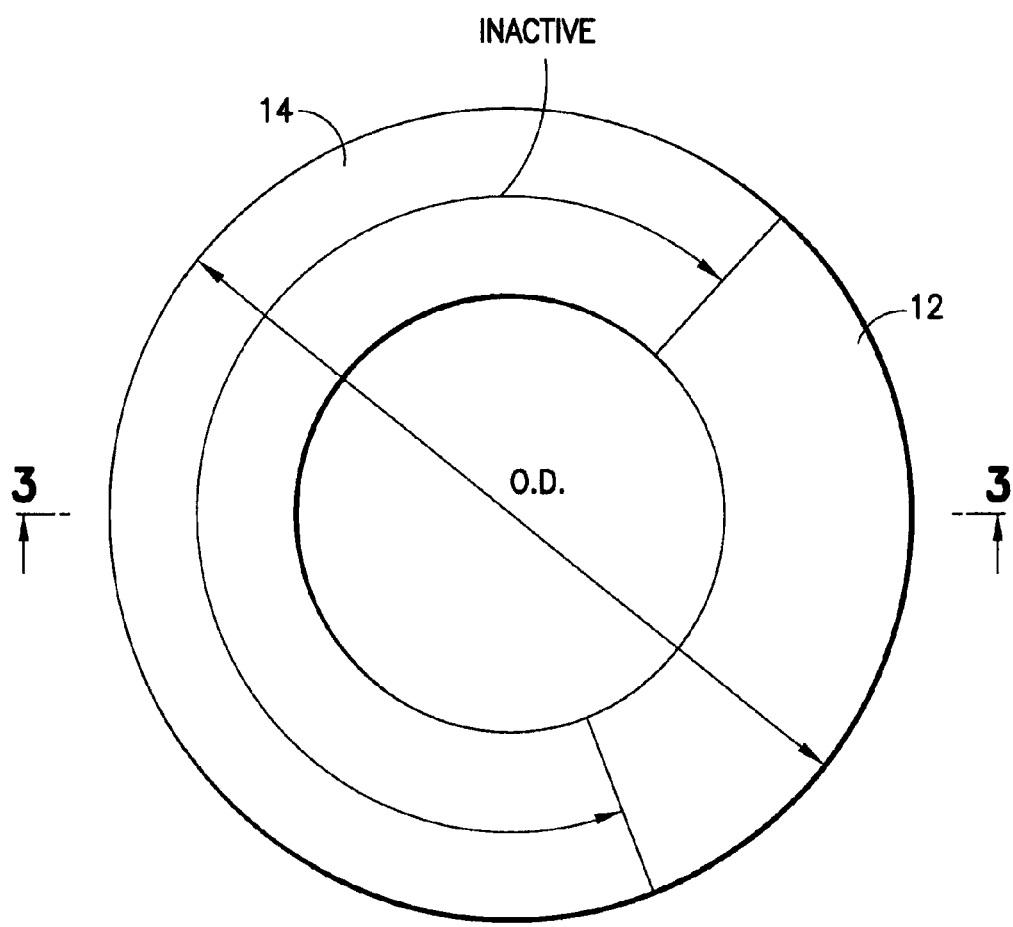
FIG. 2 is a top plan view of the spring shown in FIG. 1.
Figure 3:
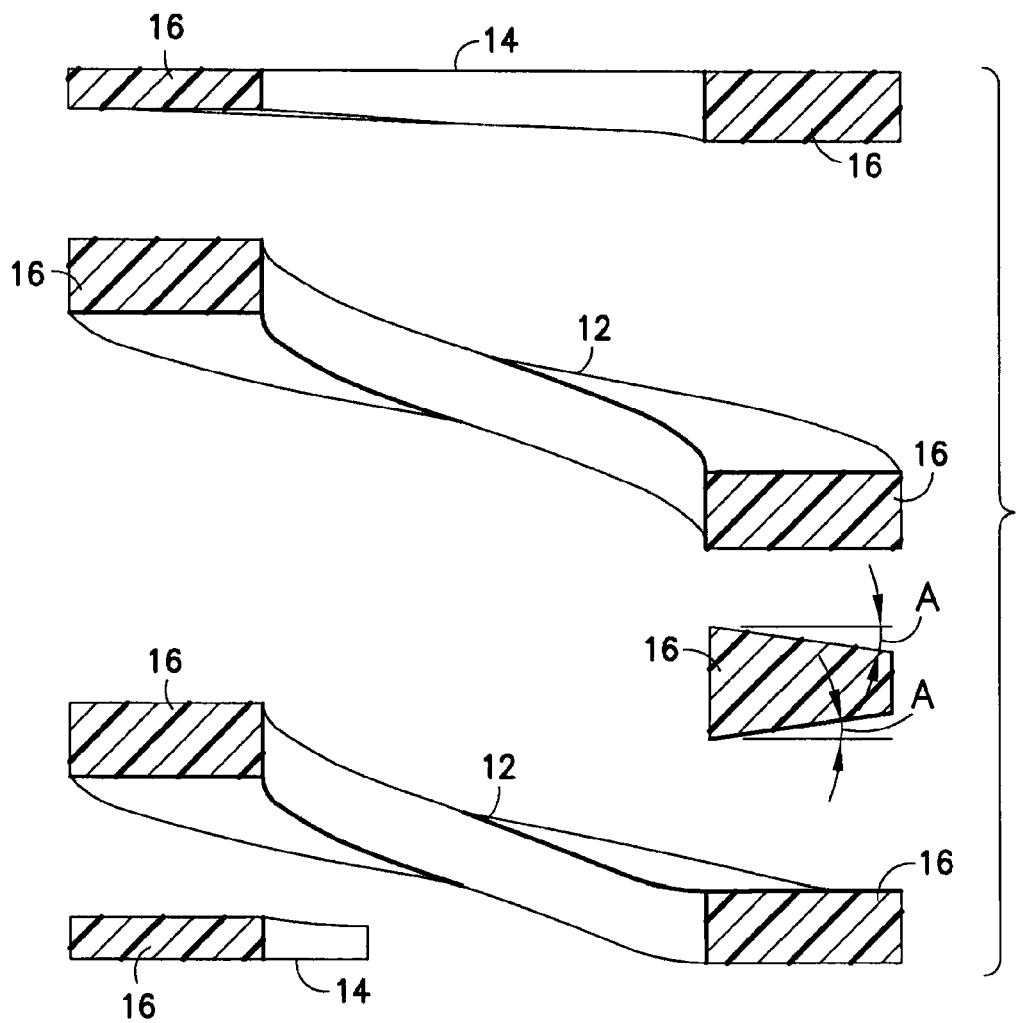
FIG. 3 is a section view taken along line 3-3 of FIG. 2.

Referring now to the drawings wherein like reference characters designate identical or corresponding parts throughout the several views, and more particularly to FIGS. 1-3, an embodiment of a spring in accordance with the present invention is designated 10. Spring 10 is formed of plastic material and comprises a helical compression spring having a free length L and an outer diameter O.D., a number of active coils 12 (i.e., coils or segments that contribute to the resistance to a compressive force being applied to the spring) and a pair of inactive end coils 14 (i.e., coils or segments that do not contribute to the resistive force of the spring). The pitch of spring

Figure 5:
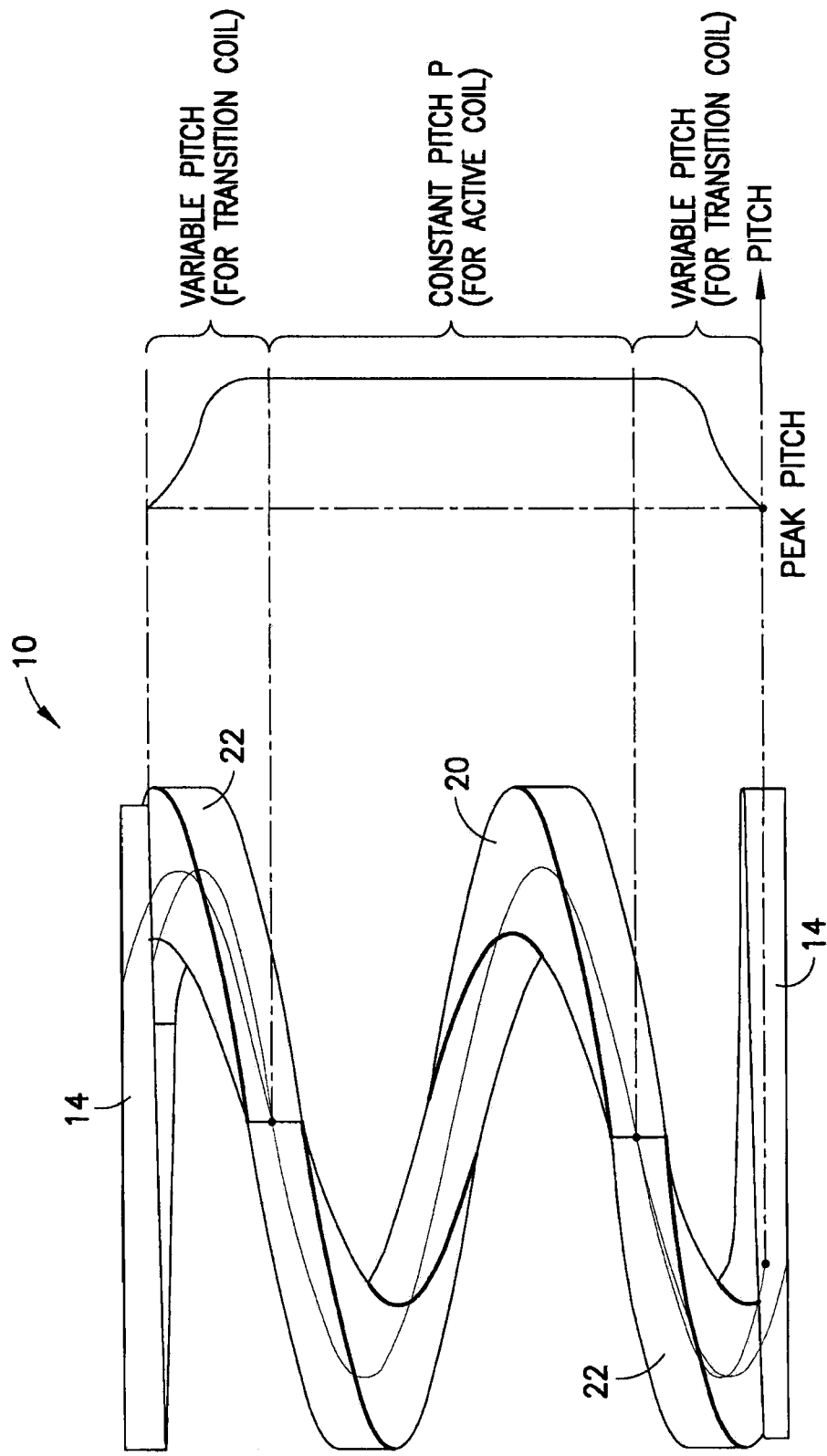
FIG. 5 is a side elevation view of the spring shown in FIGS. 1-4 showing the variable pitch of the transition coil segments and the constant pitch of the full pitch active coils of the spring.

10 (the distance, center to center, between two coils) is designated P (FIG. 5). For example, the free length L of a spring in accordance with the invention may be approximately ¾ inch while the outer diameter OD of a spring in accordance with the invention may be approximately ½ inch. The number of total coils may be approximately 4 ½. The number of full pitch active coils may be approximately 2 ½ and their pitch P is approximately ¼ inch.

In order to maximize the strength characteristics, including load-bearing capacity, of the plastic spring 10, among other things, the coils of spring 10 have a substantially rectangular cross-section 16 (see FIG. 3). A substantially rectangular cross-section maximizes the amount of active spring material per unit length of the spring.

Referring to FIG. 3, the cross-section 16 of spring 10 is formed with a slight draft—e.g., A≈½ degree, with decreasing thickness from the inside diameter of the spring to outside diameter so that the substantially rectangular cross-section is substantially trapezoidal. A trapezoidal cross-section aids the spring 10 in withstanding a greater load (strength to weight ratio) than a spring with a perfectly rectangular cross-section because the torsional stress applied to the section is biased towards the axis of the spring due to the curvature of the coils around that axis. Thus the substantially trapezoidal cross-section also increases the fatigue life of the spring. Moreover, forming the cross-section of the spring coils as an outwardly tapering trapezoid facilitates release of the part from the mold and minimizes issues with the undercuts inherent in the design of a helical spring.

The spring 10 is preferably made of a high performance thermoplastic material suitable for forming by injection molding. The ideal plastic material should be recyclable, resistant to corrosion, lightweight, have a high strength to weight ratio, have low electrical and thermal conductivity and be non-magnetic. At the same time, the plastic material should provide good strength characteristics such as high tensile strength, high modulus of rigidity (strength to section ratio) and high resistance to creep over time and at elevated temperatures. Other desirable characteristics of a plastic material are high temperature resistance, good memory, inertness, flexibility and compliance with global environmental standards, such as ROHS and REACH.

A preferred plastic material is Ultem® resin, a polyetherimide material available from SABIC Innovative Plastics. In addition to having the properties mentioned above, Ultem® resin has the following beneficial properties: hydrolytic stability, resistance to ultraviolet and gamma ray radiation, a low dissipation factor that makes it transparent to microwaves and a low level of ionic contaminants which makes Ultem® plastic suitable for use as an insulating material and in applications where sensitive electric elements are used. Springs can be molded from any of the different grades of Ultem® resin, such as Ultem 1000 or Ultem 2100, 2200 or 2300 (glass-reinforced) in order to achieve the desired strength characteristics for a particular application.

The end coils 14 are configured to provide for minimal side thrust and a maximum flat load bearing surface, without either creating stress points or increasing the solid height of the spring (the height of the spring when loaded to bring all of the coils in contact). In particular, the end coils 14 are flat and substantially closed, (the end coils of the spring are "inactive" coils, i.e., coils (or segment of a coil) having a pitch angle of zero that lie against the load bearing surface even prior to deflection; since these end coils lie against the surface bearing the load, they do not "actively" contribute to the reaction force of the spring) squared and gradually tapered on their inner sides, preferably from the start to the end of the coil. This configuration minimizes side thrust and maximizes the flat load bearing surface when the spring is loaded without either creating stress points or increasing the solid height. The reduced amount of material used in the foregoing configuration of the end coils 14 results in a lightweight spring and does not detract from spring performance. Closed and square end coils that are not smoothly tapered over their substantial entire length, e.g. where the end coils are of constant thickness or chamfered at their ends, are not practical for manufacture due to undercuts and do not act to minimize side thrust or maximize uniform load distribution as when the end coils are square, closed and tapered.

Figure 4:
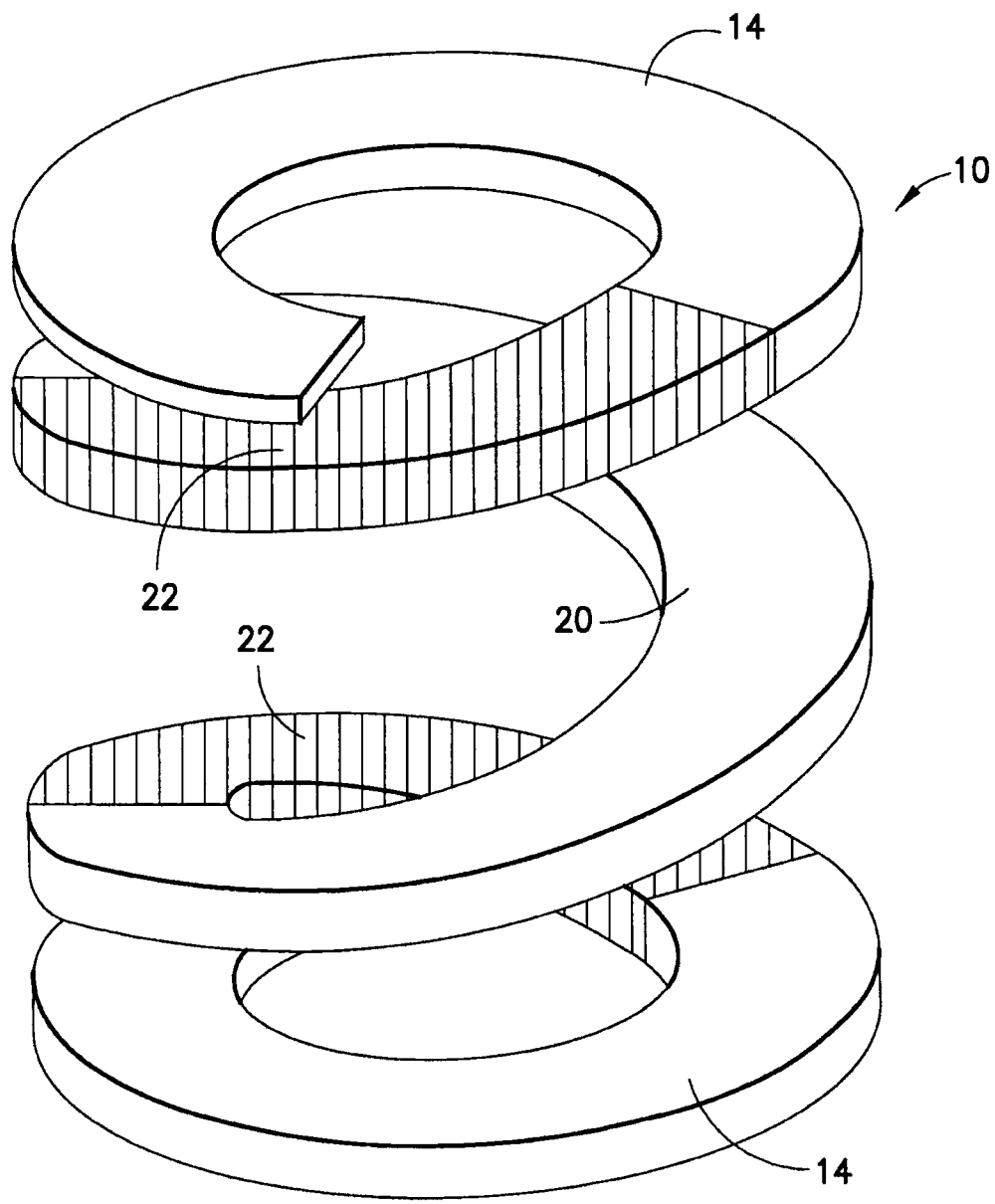
FIG. 4 is a perspective view of the spring shown in FIGS. 1-3 showing active transition coil segments interconnecting full pitch active coils and inactive end coils of the spring.

Referring now to FIGS. 4 and 5, spring 10 comprises an active constant full pitch coil 20, a pair of inactive end coils 14 and a corresponding pair of active transition coils 22 (shaded as red) connecting each end of the active constant full pitch coil 20 to the end of a respective end coil 14. In the case that a spring according to the invention includes less than one coil of full constant pitch or a plurality of active constant full pitch coils 20, each transition coil 22 connects a respective inactive end coil 14 to an end of the active constant full pitch coil proximate to that inactive end coil. In the case that a spring according to the invention includes no active constant full pitch coils 20, each transition coil 22 connects a respective inactive end coil 14 to an end of the other transition coil 22. Each transition coil 22 is an active coil (or coil segment) with a pitch that smoothly varies from the constant full pitch of the proximate active constant full pitch coil 20 to a pitch angle of substantially zero at the point at which the transition segment 22 connects to the inactive end coil 14 (see FIG. 5). The active variable pitch transition coils 22 provide a smooth transition from the active full constant pitch coil 20 to the inactive end coils 14 which are devoid of any kinks or sharp edges that could act as stress raisers and could reduce the fatigue life of the spring 10. Further, the variable pitch transition coils accommodate the achievement of a minimum 70% of end coil flat surface area that further facilitate the uniform distribution of load throughout the spring.

The construction of a spring as aforesaid provides significant advantages. For example, the construction provides a flat load bearing surface at each end of the spring to minimize side thrust. The construction maximizes the amount of active material to provide maximum strength. The solid height of the spring is minimized as is the overall weight of the spring while maximizing the strength to weight ratio of the spring. The construction of the spring along with its method of manufacture minimizes stress points (where breakage may occur over extended use) by eliminating stress raisers.

In order for a plastic spring according to the invention to have good strength characteristics, it is important that it be manufactured according to a method by which a smooth helix is obtained with minimal stress points, including stress raisers, kinks, mold seams, knit lines and other break points, where breakage may occur over extended use. These features have not been satisfactorily obtainable using conventional methods and apparatus in which four relatively similar mold sections form similar circular quadrants of the mold cavity for the spring. The problem is that undercuts inherent in a helix exist every quarter turn of each spring coil in the line of withdrawal of the mold sections which impede withdrawal of the part from the multi-section mold. Springs molded using such conventional methods and apparatus have steps formed at every quarter turn of the spring resulting in kinks and sharp edges that act as stress raisers which are detrimental to the operation and reduce the fatigue life of such springs. In accordance with an aspect of the invention, instead of using four mold sections forming four similar quarters of the mold cavity, each of the mold sections forming the springs, has one or more cavity-defining surfaces, each of which constitutes a molding surface for either the top surface of an active spring coil or the bottom surface of an active spring coil, but not both. Other surfaces of the mold sections serve as interlocking tapered shutoff surfaces to the other mold section faces for perfect alignment. Thus, another aspect the present invention comprises a method of molding a spring utilizing molding surfaces for forming either the top surface of an active spring coil or the bottom surface of an active spring coil, but not both. In the illustrated embodiment, the active coils 12 of the spring 10 are made using the method and apparatus of the invention. The coils include both active constant full pitch coils 20 and active transition coils 22. It is understood that while particular advantages are obtained when the manufacturing methods and apparatus of the invention are applied in manufacturing plastic springs according to the first aspect of the invention, the methods and apparatus of the invention may be used in the manufacture of other types of helical springs.

Figure 6:
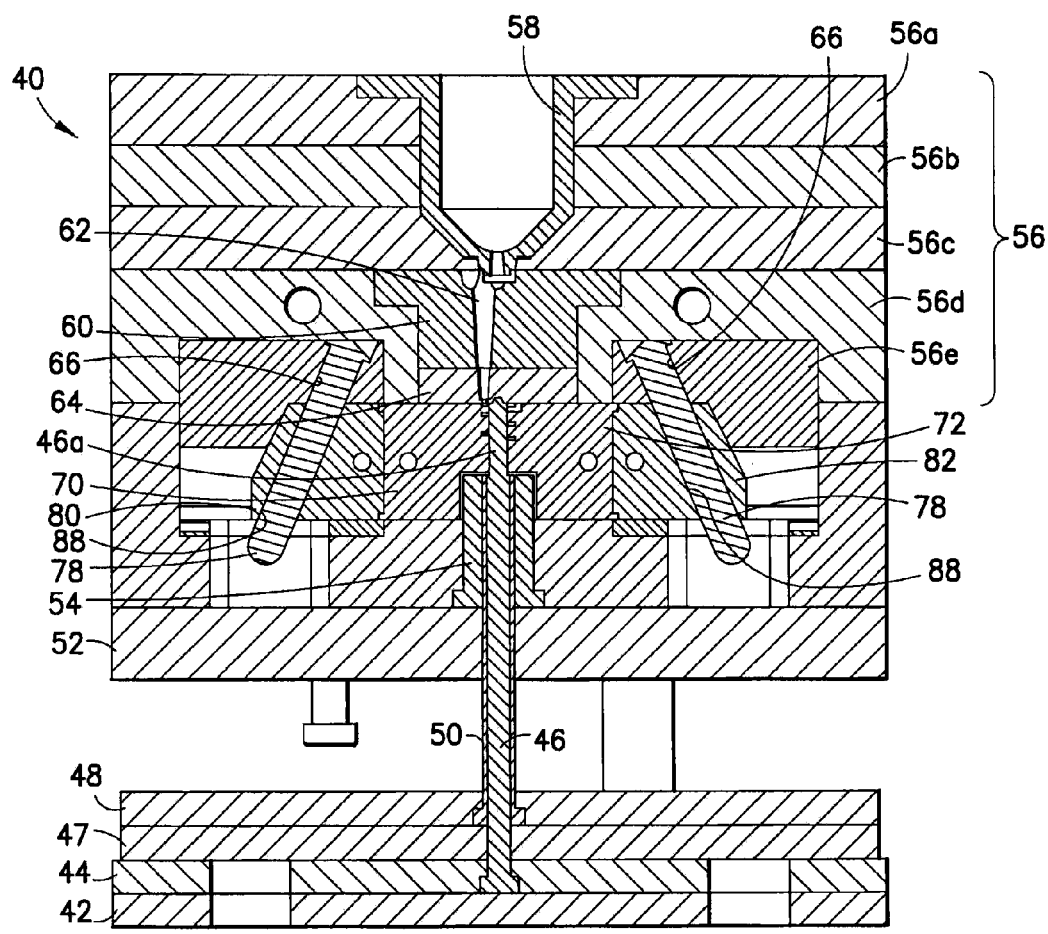
FIG. 6 is a vertical section view of molding apparatus in accordance with the present invention showing the mold sections closed.

Referring to FIG. 6, injection molding apparatus in accordance with the invention for making a plastic helical compression spring is designated 40. Molding apparatus 40 comprises a stationary mounting plate 42, a stationary core pin plate 44 in which the bottom end of core pin 46 is mounted, a spacer plate 47, a vertically movable stripper or ejector plate 48 in which the bottom end of a stripper sleeve 50 which concentrically surrounds the core pin 46 is mounted, a stationary support plate 52, on which a bushing 54 is mounted through which the core pin 46 and stripper sleeve 50 pass, so that an upper portion 46a of the core pin 46 protrudes beyond the upper edge of the stripper sleeve 50. A movable platen assembly 56 comprises platens 56a, 56b, 56c, 56d and 56e, in which a metal hopper 58 is situated, and is connected to a block 60 in which sprue 62 is formed. A cavity insert 64 is connected to the bottom of block 60. Four mold sections 70, 72, 74 and 76, only two of which 70, 72 are seen in FIG. 6, are movably situated on the four sides of core pin portion 46a respectively. The platen 56e has two pairs of symmetrical slanted slots 66 (only one pair shown in FIG. 6) in which respective guiding rods 78 are mounted. Four laterally movable press plates 80, 82, 84, 86, only two of which (80, 82) are seen in FIG. 6, have guide holes 88. Each of the guiding rods 78 engages in a corresponding slanting guide hole 88. When the upper platen 56e moves downwardly, the guiding rods 78 cam the press plates 80, 82, 84 and 86 inwardly towards each other. The press plates engage corresponding mold sections 70, 72, 74 and 76 and move them towards the core pin portion 46a until mold surfaces in the mold sections define, together with the core pin portion 46a and insert 66, a mold cavity for a helical compression spring.

Figure 7:
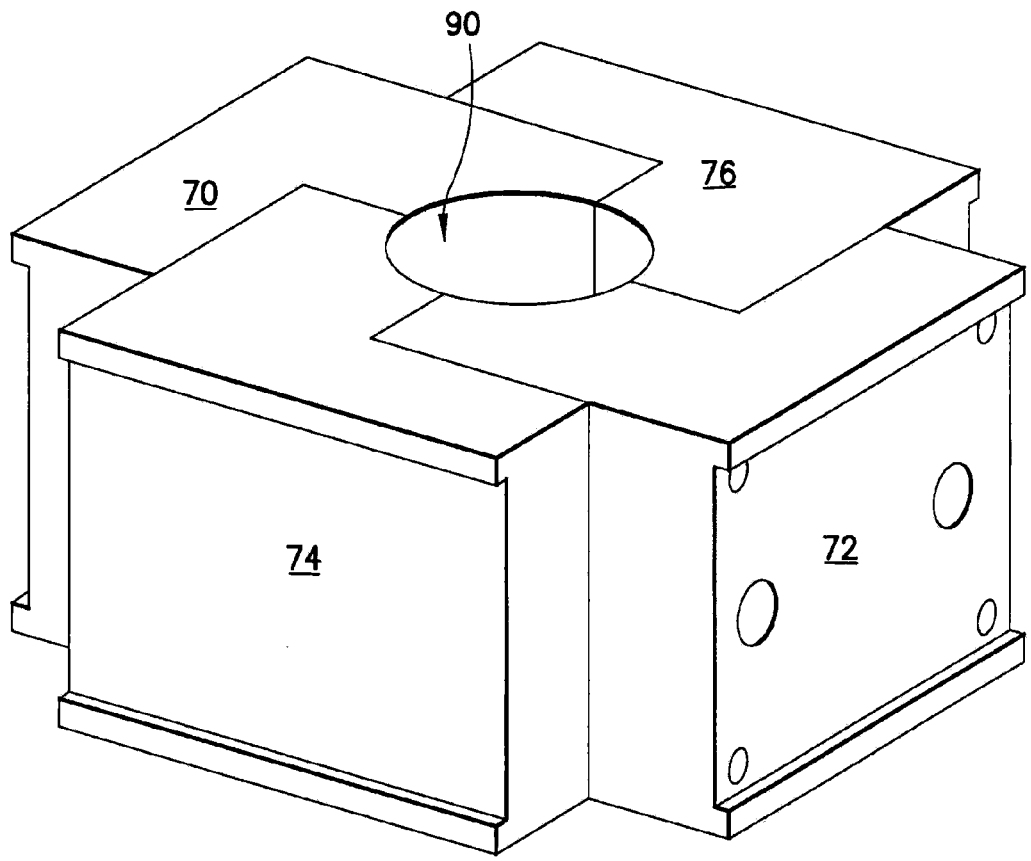
FIG. 7 is a perspective view of four mold sections of the molding apparatus of FIG. 6 in their closed positions.

Referring to FIGS. 7-12, the construction and interrelationship of the four mold sections 70, 72, 74 and 76 will be described. The mold cavity 90 having the shape of a spring is formed when the four mold sections 70, 72, 74 and 76 are in their closed position as seen in FIG. 7. Mold sections 70 and 72 are designated the right and left mold sections while the mold sections 74 and 76 are designated the bottom and top mold sections.

As mentioned above, each of the mold sections has one or more cavity-defining surfaces, each of which constitutes a molding surface for one of either the top surface of any particular segment of an active coil or the bottom surface of any particular segment of an active spring coil, but not both. Furthermore, each segment of any active coil has its top surface and bottom surface formed by two different mold sections.

Figure 8:
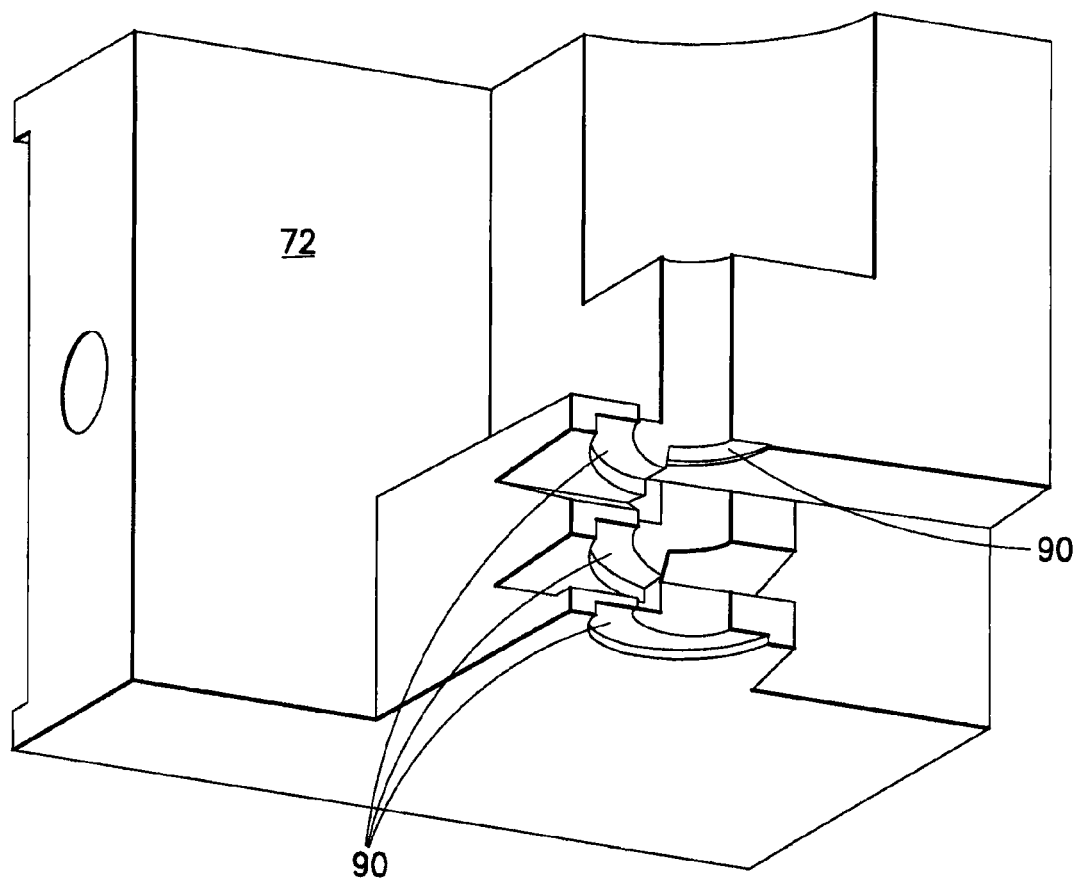
FIG. 8 is a perspective view of the left mold section of the molding apparatus of FIG. 6.
Figure 9:
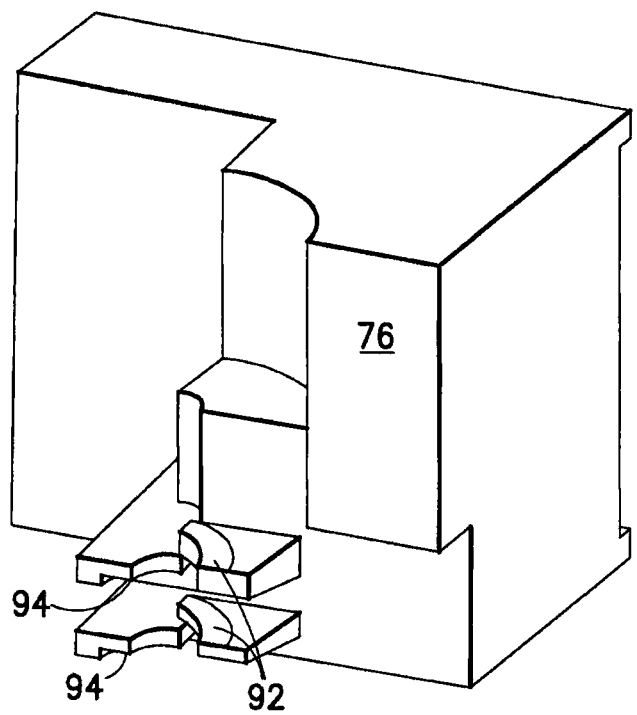
FIG. 9 is a perspective view of the top mold section of the molding apparatus of FIG. 6.
Figure 10:
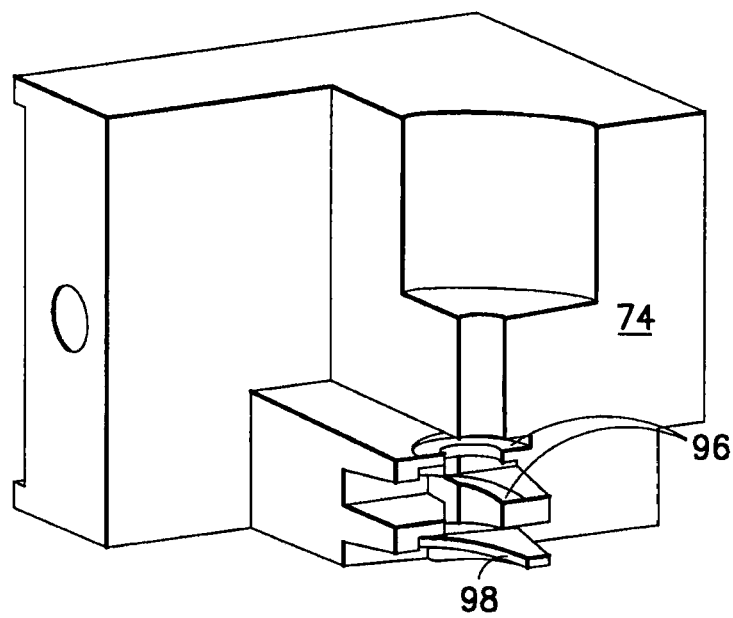
FIG. 10 is a perspective view of the bottom mold section of the molding apparatus of FIG. 6.
Figure 11:
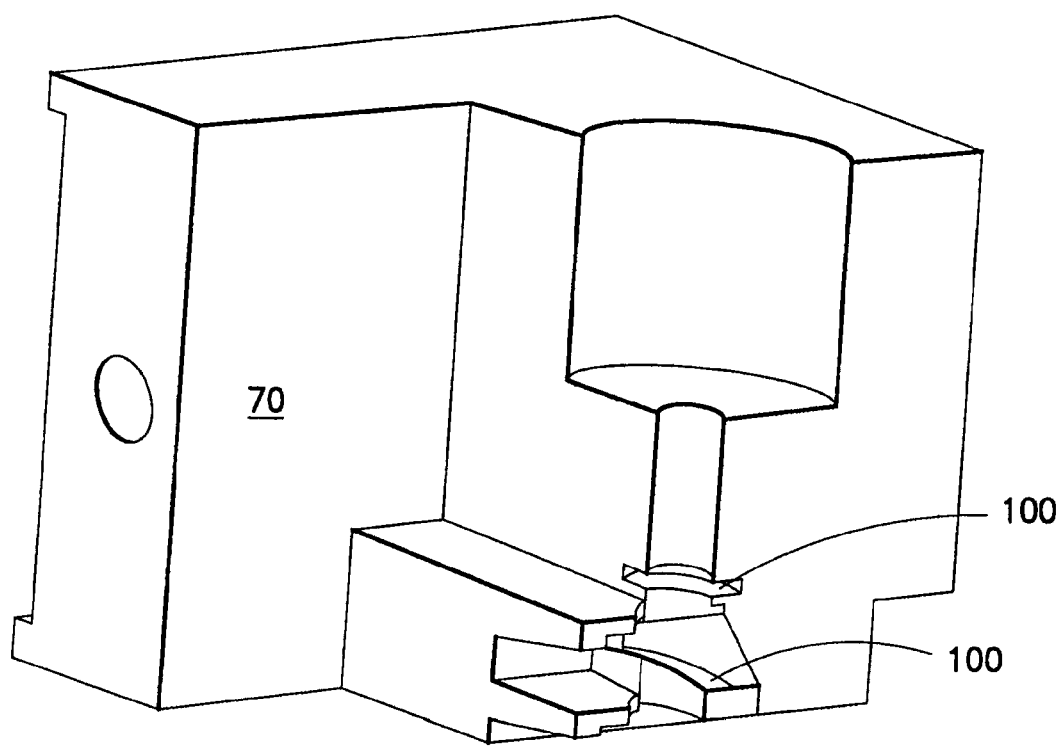
FIG. 11 is a perspective view of the right mold section of the molding apparatus of FIG. 6.
Figure 12:
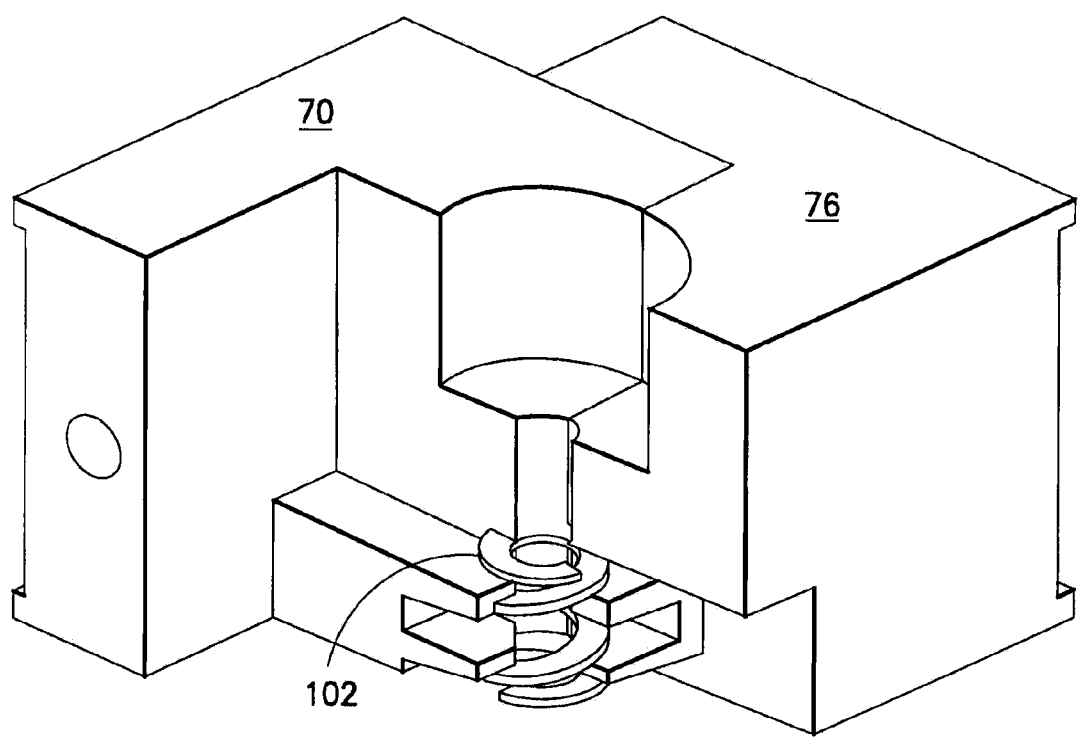
FIG. 12 is a perspective view showing the right and top mold sections of the molding apparatus of FIG. 6 in their closed position and a molded spring.

Referring to FIG. 8, the left mold section 72 includes molding surfaces 90 for forming only the top surfaces of segments of several active spring coils, as well as segments of the outer side surfaces of the coils. The left mold section 72 also includes molding surfaces (not shown) for forming only the bottom surface of other segments of the spring coils. FIG. 9 shows the top mold section 76 including molding surfaces 92 for forming only the bottom surfaces of segments of several active spring coils and molding surfaces 94 for forming only the top surfaces of several active spring coils. FIG. 10 shows the bottom mold section 74 including molding surfaces 96 for forming only the bottom surfaces of coil segments of the helical spring, as well as molding surface 98 for forming the outer side surfaces of certain segments of the coil spring. Bottom mold section 74 also includes molding surfaces (not shown) for forming only the top surfaces of other segments of the active spring coils. FIG. 11 shows the right mold section 70 including molding surfaces 100 for forming only the bottom and outer side surfaces of segments of the spring coils. Right mold section 70 also includes other molding surfaces (not shown) for forming only the top surfaces of other segments of the spring coils. FIG. 12 shows a sectional view of the right and top mold sections 70 and 76 in the closed position defining a part of the mold cavity, and a spring 102 formed by all the mold sections.

Figure 13A:
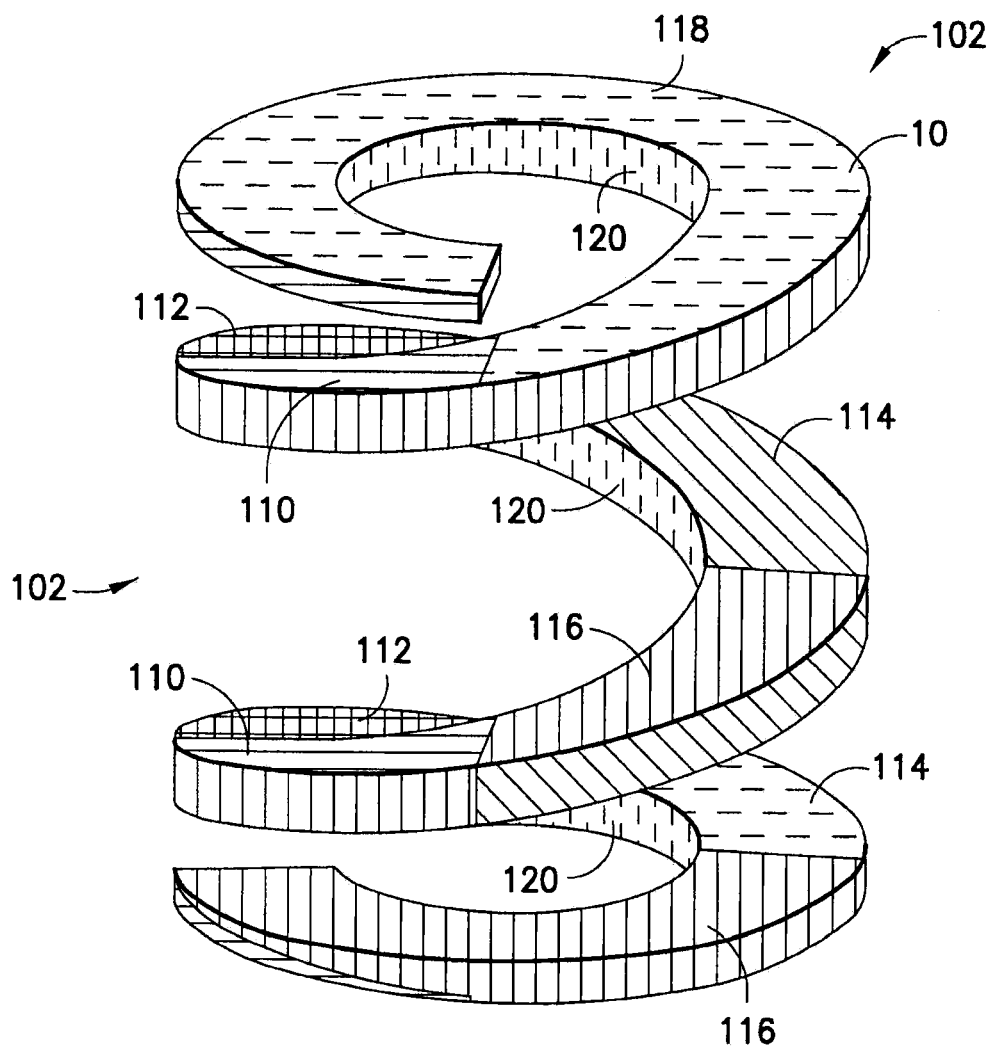
FIG. 13A is a top perspective view of the plastic helical spring in accordance with the present invention showing upper, inner and outer surfaces of the spring coils and designating different segments of the upper, inner and outer surfaces as having been formed by respective mold surfaces in accordance with the method of the present invention.
Figure 13B:
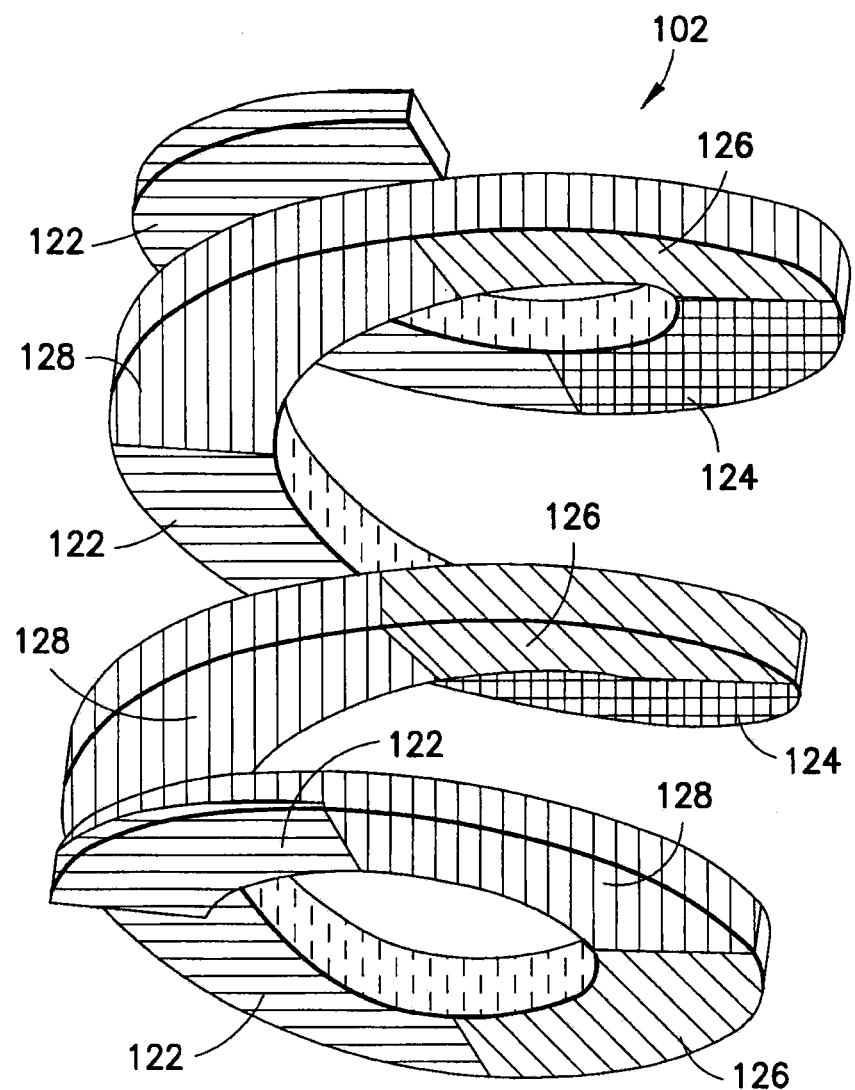
FIG. 13B is a bottom perspective view of the spring shown in FIG. 13A showing lower, inner and outer surfaces of the spring coils and designating different segments of the lower, inner and outer surfaces as having been formed by respective mold surfaces in accordance with the method of the present invention.

The portions of the top, bottom, inner and outer surfaces of spring coil segments molded by the molding surfaces of respective mold sections 70, 72, 74 and 76 are shown in FIGS. 13A and 13B. In particular, referring to FIG. 13A, the top surface portions 110 (shaded as blue) of the coils of spring 102 are formed by molding surfaces of the bottom mold section 74, the top surface portions 112 (shaded as gold) of the coils of spring 102 are formed by molding surfaces of the left mold section 72, the top surface portions 114 (shaded as green) of the coils of spring 102 are formed by molding surfaces of the right mold section 70 and the top surfaces portions 116 (shaded as red) of the coils of spring 102 are formed by molding surfaces of top mold section 76. The top surface portion 118 (shaded as gray or silver) of the top inactive end coil is formed by a molding surface on the cavity insert 64, and the inner edge surfaces 120 (shaded as violet or purple) of the coils are formed by the outer surface of the upper portion 46a of core pin 46. The outer edge surface portions of the coils are formed by various molding surfaces of the molding sections.

Referring to FIG. 13B, the bottom surface portions 122 (shaded as blue) of the coils of spring 102 are formed by molding surfaces of bottom mold section 74, the bottom surface portions 124 (shaded as gold) of the coils are formed by molding surfaces of left mold section 72, the bottom surface portions 126 (shaded as green) of the coils are formed by molding surfaces of right mold section 70, and bottom surface portions 128 (shaded as red) of the coils are formed by molding surfaces of top mold section 76. It is seen that in no case are both the top and bottom surfaces of the same coil (or coil segment) formed by the same molding surface of a mold section.

Figure 14:
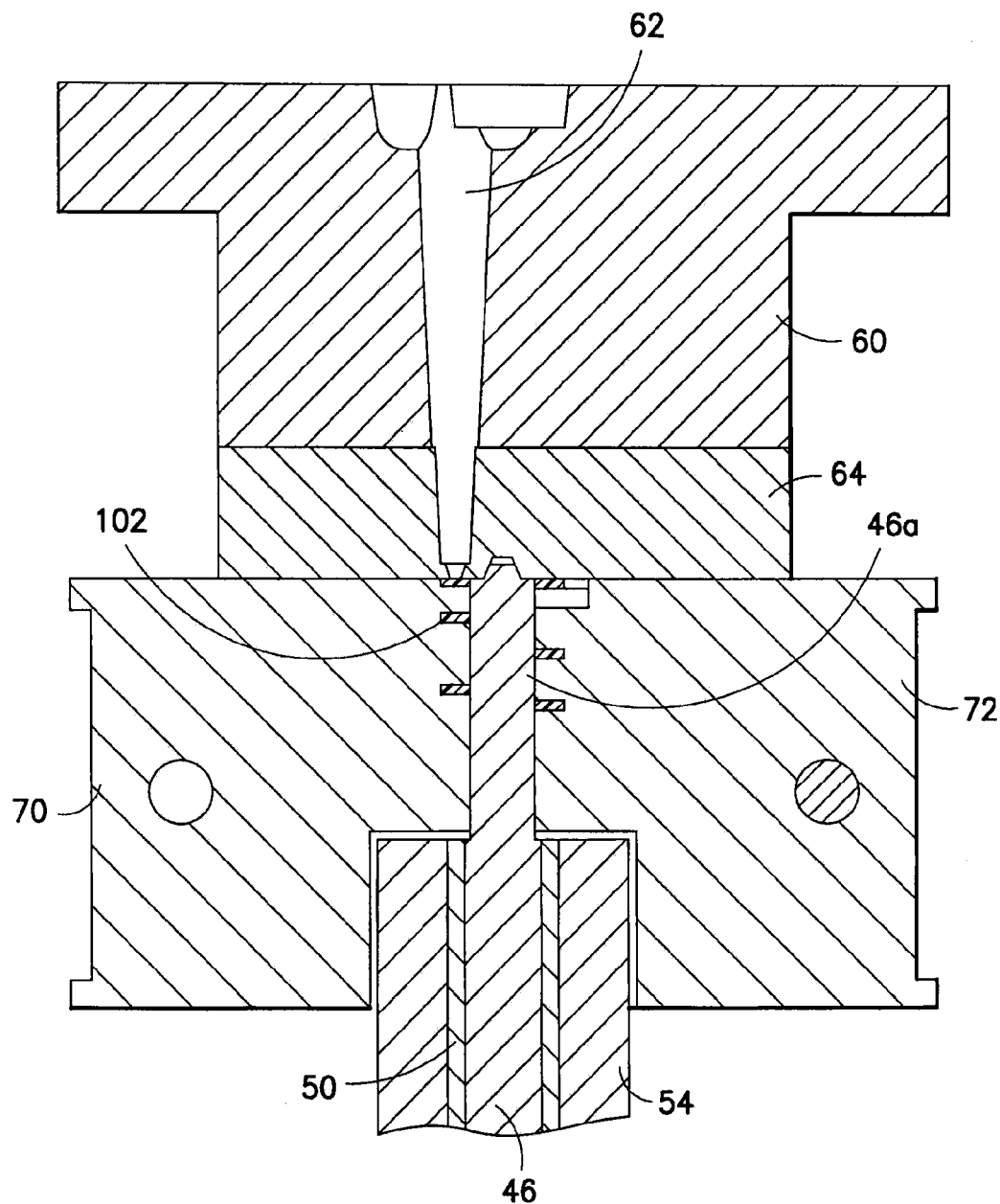
FIG. 14 is a vertical section view of a portion of the molding apparatus of FIG. 6 showing mold sections in their closed positions and the cavity insert resting on the molded spring.
Figure 15:
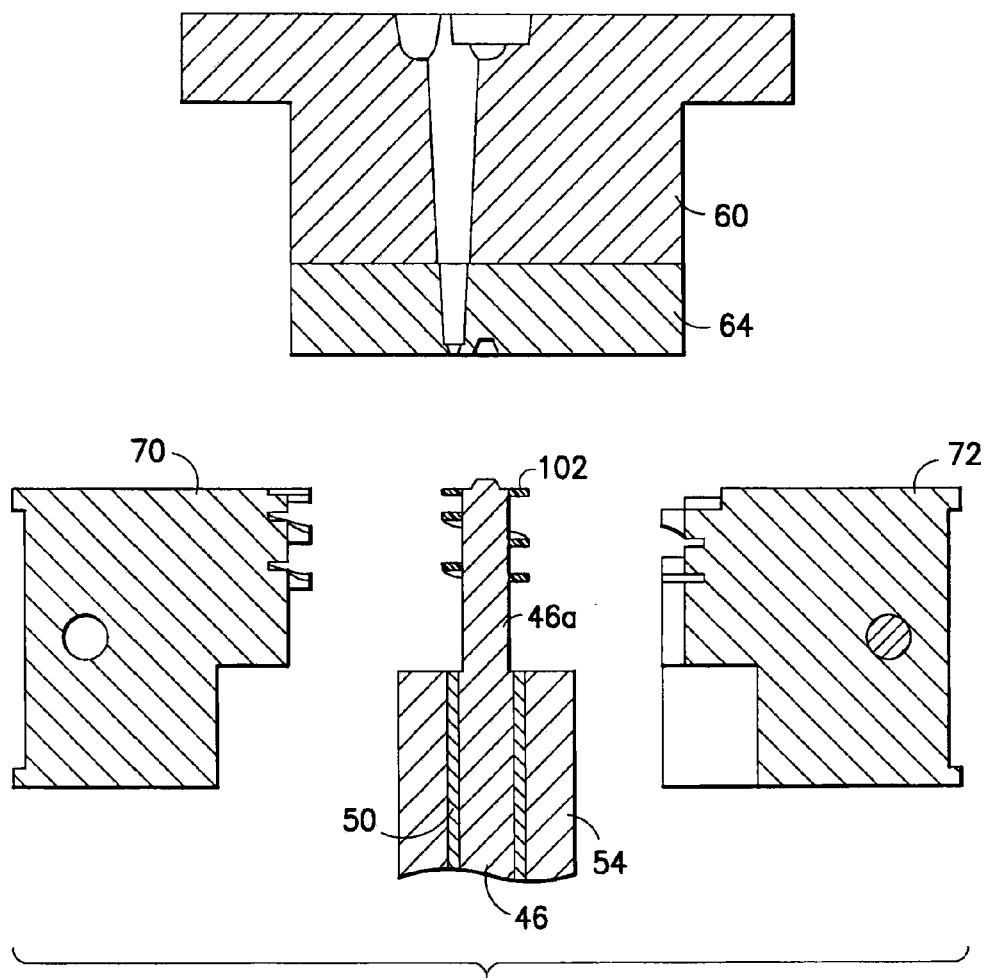
FIG. 15 is a vertical section view of the portion of the molding apparatus shown in FIG. 14 showing mold sections and the cavity insert in their retracted positions.
Figure 16:
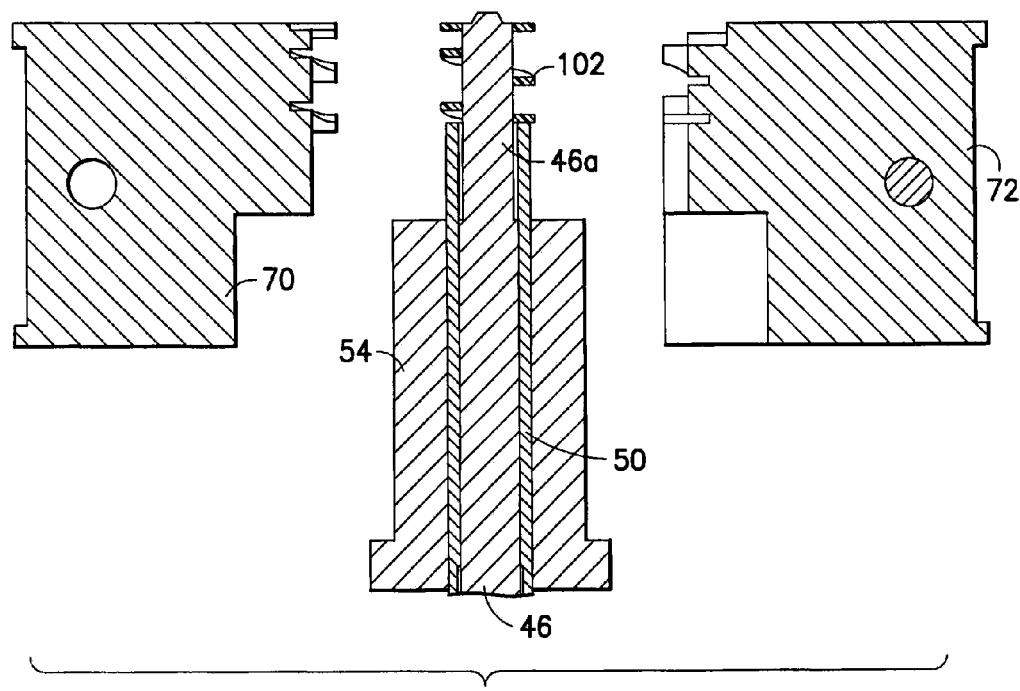
FIG. 16 is a vertical section view of the portion of the molding apparatus shown in FIGS. 14 and 15 showing the stripper sleeve engaging the molded spring.
Figure 17:
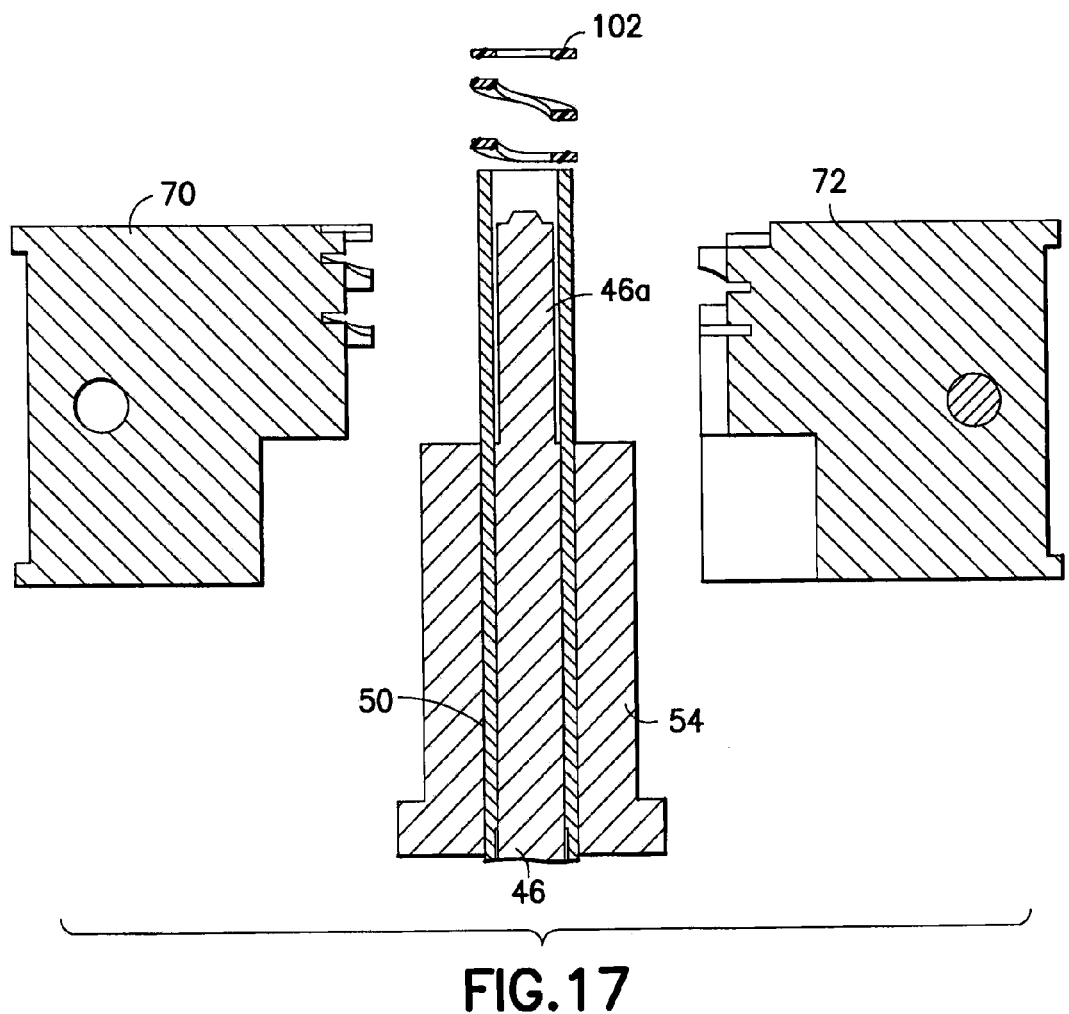
FIG. 17 is a vertical section view of the portion of the molding apparatus shown in FIGS. 14-16 showing the stripper sleeve having stripped the molded spring from the core pin.

Referring now to FIG. 14, the mold sections 70, 72, 74 and 76 (only 70 and 72 shown) are shown in their closed position with their mold surfaces defining, along with the surfaces of core pin portion 46a and cavity insert 64, the die cavity for spring 102. Plastic material is injected into the die cavity through sprue 62. As seen in FIG. 15, after the spring 102 is formed, the mold sections 70, 72, 74 and 76 (only 70 and 72 are shown) are moved to their open position and together with the cavity insert are separated from the molded spring 102. Thereafter, as shown in FIG. 16, the stripper sleeve 50 is raised and engages the spring 102. The stripper sleeve 50 is raised a further amount (FIG. 17) and strips the finished spring 102 from the core pin portion 46*a*.

It is seen from the foregoing that according to one aspect of the invention, a plastic helical spring is designed which provides maximum strength, provides a flat bearing surface at each end to minimize side thrust, and which minimizes solid height and weight, among other advantages. According to other aspects of the invention, a method and apparatus are provided for manufacturing a plastic helical spring in which stress points are minimized and injection mold manufacturability is maximized.

Obviously, numerous modifications and variations of the present invention are possible in the light of the above teaching. It is therefore to be understood that within the scope of the claims appended hereto, the invention may be practiced otherwise than as specifically disclosed herein.

We claim:

1. A helical spring formed of plastic material, comprising:
    a pair of end coils situated at respective ends of said helical spring;
    at least one full constant pitch active coil between said pair of end coils;
    a pair of transition coils, each transition coil interconnecting an end of a respective end coil to an end of a respective proximate one of said full constant pitch active coils, and
    wherein the pitch of each of said transition coils varies gradually and continuously from substantially said full pitch at a first point of connection of said transition coil to said respective proximate full constant pitch coil to a pitch angle of substantially zero at a second point of connection of said transition coil to said respective end coil.

2. A helical plastic spring as recited in claim 1 wherein said plastic material comprises a high strength thermoplastic material.

3. A helical plastic spring as recited in claim 2 wherein said thermoplastic material comprises polyetherimide.

4. A helical plastic spring as recited in claim 1 wherein each of said end coils is flat and tapered on its inner side towards a free end of said end coil.

5. A helical plastic spring as recited in claim 1 wherein said spring coils have a substantially rectangular cross section.

6. A helical plastic spring as recited in claim 1 wherein said spring coils have a substantially trapezoidal cross-section tapering in an outward direction.

* * * * *